UNITED STATES PATENT OFFICE.

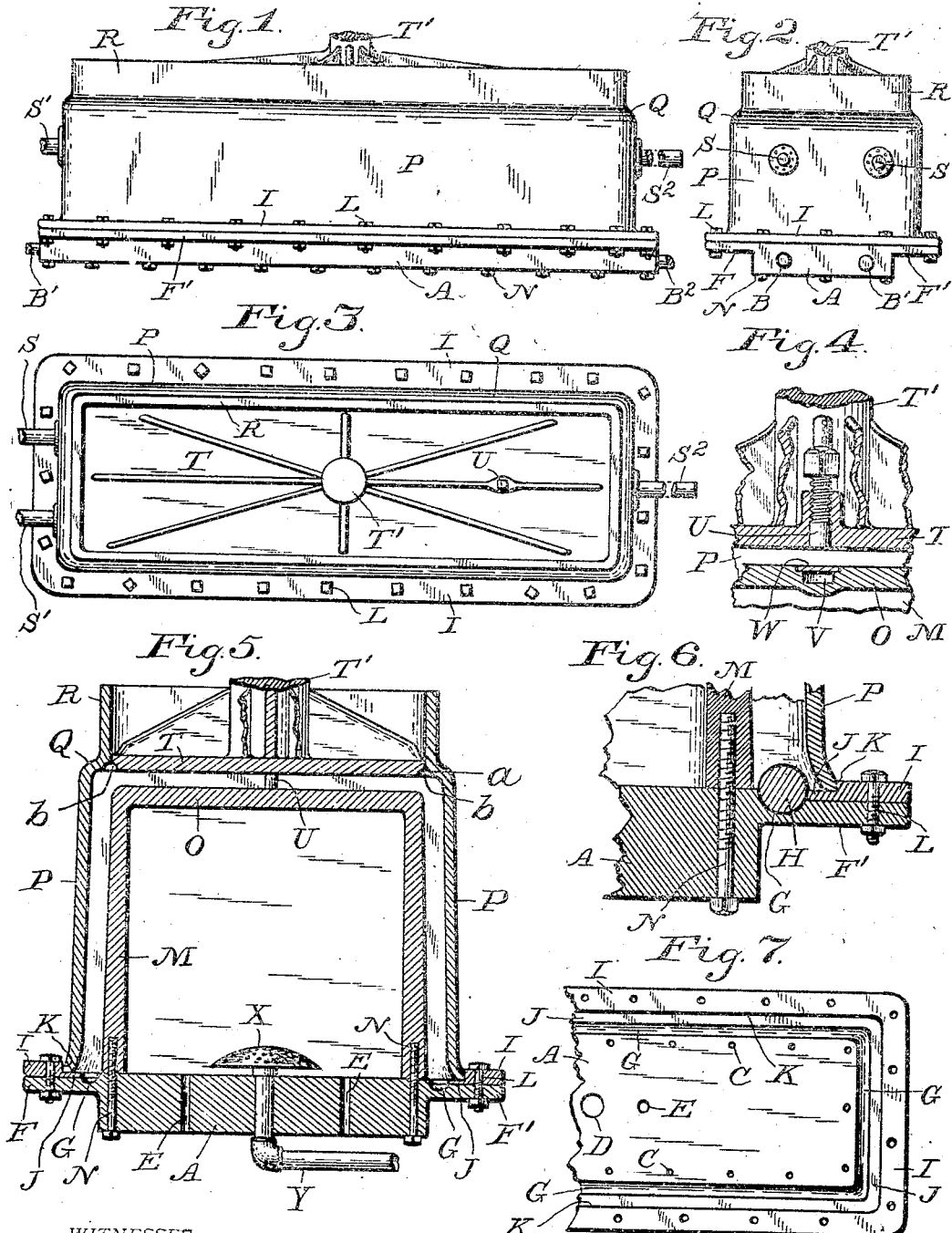

JACOB BONSHIRE, OF PERU, KANSAS, AND JAMES M. STAFFORD, OF PETERSBURG, INDIANA.

MOLD FOR GLASS CASKETS, BATH-TUBS, OR SIMILAR ARTICLES.

No. 875,567.

Specification of Letters Patent.

Patented Dec. 31, 1907.

Application filed February 15, 1907. Serial No. 357,433.

*To all whom it may concern:*

Be it known that we, JACOB BONSHIRE and JAMES M. STAFFORD, citizens of the United States, residing at Peru, in the county of Chautauqua, State of Kansas, and at Petersburg, in the county of Pike and State of Indiana, respectively, have invented certain new and useful Improvements in Molds for Glass Caskets, Bath-Tubs, or Similar Articles; and we do declare the following to be a full, clear, and exact description of the invention, reference being had to the accompanying drawings, and to the letters and figures of reference marked thereon, which form a part of this specification.

This invention relates to metallic molds for making heavy glassware such as burial caskets or vaults, bath tubs and similar vessels, the invention having reference particularly to molds or forms for shaping the articles of molten glass.

The objects of the invention are to provide a mold of the above-mentioned character whereby vessels or articles similar to bath tubs may be formed with the molten glass under pressure so as to obtain the best results in producing walls of approximately uniform density and strength, a further object being to provide a mold for the above-mentioned purposes whereby caskets or the like may be produced expeditiously and economically of glass or similar material.

With the above-mentioned and minor objects in view the invention consists in a mold comprising a base upon which the top of the side of the vessel or article may be formed, an inner form attached to the base for shaping the interior of the vessel or article, a form plate mounted on the base for partially forming the top of the article, an outer form for shaping the exterior of the article and adapted to be gaged on the form plate, the outer form extending about the inner form and open at its top and provided with a neck in which a plunger is guided that shapes the bottom of the vessel or other article against the inner form and presses the material for the side wall between the inner form and the outer form, the mold being provided with means for heating the chamber formed by the inner form and the base for heating the mold. And the invention consists further in the novel parts and the combinations and arrangements of parts as hereinafter particularly described and referred to in the accompanying claims.

Referring to the drawings Figure 1 is a side elevation of the mold; Fig. 2, an end elevation; Fig. 3, a top plan; Fig. 4, a fragmentary sectional detail showing attachments to the plunger and the inner form; Fig. 5, a transverse vertical sectional view approximately at the center of the mold; Fig. 6, a fragmentary detail view; and, Fig. 7, a fragmentary top plan of the base and form plate thereof.

Similar reference characters in the different figures of the drawings designate like parts or features of construction.

The mold comprises a base A that is adapted to be supported in a suitable machine, the base being usually oblong in plan, but the contour may be variously shaped to suit such article as may be desired, the contour in the present instance being substantially rectangular with rounded corners. The narrower ends of the base are provided with handle-bars B B' B² for lifting the base. The base is provided with a suitable number of bolt holes C arranged at a suitable distance from the edge of the base to receive bolts for securing the inner form to the base, the latter also having an aperture D to receive a gas pipe, and other apertures E for the passage of air through the base.

The base has two projecting flanges F and F', one at either side thereof, and a groove G is formed in the top of the base that extends between the bolt holes C and the edge of the base, the groove being semicircular transversely so that when the molten glass is formed on the base, said groove will form a tongue or bead for matching or jointing purposes on the top of the side wall of the casket when such article is made. A suitable filling H is provided which is cylindrical in cross-section and may be inserted into the groove G so as to fill the groove and also provide a form similar to a bead upon the base so that a groove may be produced in the top of the side wall of the casket to receive the tongue or bead which may have been previously formed on a companion part by means of the groove G.

A form plate I rests upon the base A, portions thereof being on the flanges F and F' of the base and extends inwardly to the groove G, the inner portion J having less height than the main portion of the plate so that a gage shoulder K is formed for gaging the outer form. The top of the thinner portion J is in the same plane as the portion of the base A that is inward of the groove G, the outer portion or main portion of the plate I extending somewhat higher. The plate I is normally held in place by a suitable number of bolts L.

An inner form for shaping the interior of the casket or other article is made of suitable contour and comprises an endless side wall M that is normally secured to the base A by bolts N, the inner form having a top O attached to the side wall or integral therewith to form the inner surface of the bottom part of the article that is to be molded, said inner form somewhat resembling a casket or a bath tub inverted upon the base, the contour of course being in accordance with the contour of the base.

An outer form comprises a side wall P which is continuous about the inner form and somewhat larger in dimensions, the side wall P resting upon the thinner portion J of the form plate I and against the shoulder K thereof. The opposite or uppermost edge of the side wall P has an inwardly curved portion Q from which extends a neck wall R into which the glass may be poured for forming the desired article. The narrower end portions of the wall P are provided with handle-bars S S' S² for lifting and controlling the outer form.

A plunger T is adapted to move vertically in the neck R and be guided thereby, and is provided with a centrally arranged shank T' adapted to be secured to a suitable portion of the machine in which the base A may be supported so that the machine may operate the plunger to withdraw it from the neck R or to force the plunger downwardly in the neck. The plunger T is provided with an adjustable former U that may be held with an end thereof flush with the lower face of the plunger or be projected downwardly a suitable distance so as to enter a recess V that is formed in the top portion O of the inner form, the recess V being normally provided with a cover W which however, may be removed so that the former U may enter the recess. This former U is intended to be used when molding the top or lid portion of the casket to force the glass into the recess V whereby to form a cup shaped portion, the bottom of which may afterward be ground off so as to produce a vent hole in the top of a burial casket; the vent hole as will be understood being provided with a valve so that a partial vacuum may be produced in the casket after having been sealed.

A gas burner X is arranged above the base A, being within the inner form, and is provided with a supply pipe Y so that the mold may be suitably heated before molding operations are begun.

Preferably a groove $a$ is formed at the interior of the outer form at the junction of the curved portion Q and the neck R, a corresponding groove $b$ being formed in the under side of the edge of the plunger T so that the two grooves will form a bead under the bottom of the casket or bath tub along the rounded edge thereof.

It will be understood that the form plate I may be variously shaped, and also the top of the base A may vary somewhat to suit the formation of various articles, as for instance to form sealing joints between the body part and the cover part of a burial casket or other casket as herein described, or the modifications may be adapted to form the top edge of the wall of a bath tub or other vessel in any desired shape. And if desired of course the longer sides of the side walls of the inner and outer forms may be curved or formed in accordance with the conventional coffin shape instead of being straight as illustrated, but as will be understood the inner and outer forms have a suitable amount of draft taper to permit of withdrawal from the molded article.

In practical use a suitable portion of the operating machine with which the mold is to be used, will press upon the outer form P to normally hold it upon the form plate I. The plunger T is to be elevated out of the way and then the molten glass or similar material is to be poured into the neck R so as to flow over the top O of the inner form and into the space between the inner form and the outer form down onto the base A, and after a predetermined amount of the material has been poured in, the plunger T is to be forced gradually down into the neck R until a point is reached approximately as shown in Fig. 5 which will cause all spaces to be filled and form a bottom for the vessel of suitable thickness between the top O and the plunger T. Any air may be forced out under the lower edge of the outer form wall P, the facings of the parts being slightly uneven so that air may escape, it being understood that the joint faces need not be machine finished, or suitable vents obviously may be provided. The product may readily be removed from the mold after having become sufficiently cooled.

Having thus described the invention, what is claimed as new is—

1. A mold including a perforate base, a separate hollow inner form comprising a side wall and a top on the wall to form a closed chamber accessible through the perforation in the base, a continuous outer form to inclose the side wall only of the inner form, and a plunger in the outer form to cover the top of the inner form.

2. A mold including a perforate base, a separate hollow inner form to be inverted on the base and form a closed chamber accessible only through the perforation in the base, means for holding the inner form on the base, a continous outer form to inclose the side wall only of the inner form, means for gaging the outer form on the base and with respect to the inner form, and a plunger in the outer form to cover the inner form.

3. A mold for glass vessels including a base having an air-hole therein, a hollow inner form mounted on the base to shape the interior of a vessel inverted, an outer form on the base and extending about the inner form to shape the exterior of the side wall of the vessel, a plunger movable in the outer form to shape the exterior of the bottom of the vessel, and a burner in the hollow inner form upon the base.

4. A mold for glass vessels including a base having a hollow inner form secured thereto removably, a form plate on the base and extending about the lower portion of the inner form, there being also a groove extending about the lower portion of the inner form, an outer form supported by the base and extending about the groove and the inner form and having a plunger therein movable opposite to the inner form, a supply pipe extending through the base, and a burner connected to the supply pipe above the base.

5. A mold for glass vessels including a base, a hollow inner form secured removably on the top of the base, a form plate on the base and extending about the lower portion of the inner form, there being also a groove extending about the lower portion of the inner form, a filler inserted removably in the groove, an outer form mounted removably on the form plate and gaged thereby with respect to the inner form, and a plunger guided by the outer form opposite to the top of the inner form, said inner form having a heater therein.

6. A mold for glass vessels including a base, a hollow inner form mounted on the base and having a closed top provided with a recess in the uppermost portion thereof, a form plate on the base extending about the lower portion of the inner form, an outer form mounted on the form plate about the inner form and having an open neck at the top thereof, a plunger movable in the neck of the form opposite to the top of the inner form and provided with an adjustable former opposite to the recess, and a cover for the recess.

7. A mold for glass vessels including a base provided at opposite ends thereof with handle bars, a hollow inner form secured detachably on the base and having a closed top, said base having a groove therein extending about the lower portion of the form, a filler insertible in the groove, a form plate secured detachably on the base and having a gage shoulder, an outer form extending on the form plate against the shoulder thereof about the inner form and provided on opposite ends thereof with handle bars, said outer form having an open neck and a groove extending about the base of the neck internally, and a plunger movable in the neck opposite to the top of the inner form and having a groove in the lowermost edge thereof.

8. A mold for glass vessels including a base, a hollow inner form having a side wall removably arranged on the base and a top on the side wall above the base, screw-bolts extending through the base and engaging the side wall of the inner form, a form plate on the base and having a gage shoulder, an outer form extending on the form plate against the shoulder thereof and about the inner form, and a plunger in the outer form to cover the top of the inner form.

9. A mold for glass vessels including a base, a hollow inner form secured on the base and having a closed top, a form plate detachably mounted and gaged on the base and having a gaging device, and an outer form extending on the form plate in engagement with the gaging device thereof about the inner form and provided on opposite ends thereof with lifting devices, said outer form having an inwardly-extending portion above the plane of the top of the inner form, said portion having a neck on the top thereof provided with a coöperating plunger movable therein above the top of the inner form.

10. In a mold for glass vessels, a pair of hollow forms, one form being an inner form comprising a side wall and a closed top, the form having an open bottom, and the other one of the forms comprising only a side wall to extend about the side wall of the inner form, in combination with a base to support the pair of forms, and a plunger to cover the top of the inner form within the outer form.

11. In a mold for glass vessels, a base having flanges at opposite sides thereof, and a pair of hollow forms, one form being an inner form to rest on the base and comprising a side wall and a closed top on the top of the wall, and the other form comprising a side wall only to extend about the side wall of the inner form upon the flanges of the base, and screw-bolts extending through the base and engaging the side wall of the inner form, in combination with a plunger to cover the top of the inner form in the outer form.

12. In a mold for glass vessels, a base having flanges at opposite sides thereof and provided on the tops of the flanges with a form plate having a gage, an inner form on the base, screw-bolts extending through the base and engaging the inner form, and an outer form on the form plate and in contact with the gage thereof and provided at opposite ends thereof with handles, in combination with a plunger to cover the inner form in the outer form.

In testimony whereof, we affix our signatures in presence of two witnesses.

JACOB BONSHIRE.
JAMES M. STAFFORD.

Witnesses:
 WM. H. PAYNE.
 E. T. SILVIUS.